United States Patent

Gray et al.

[15] 3,661,615

[45] May 9, 1972

[54] SUBSTRATE COATING PROCESS

[72] Inventors: Don N. Gray, Sylvania, Ohio; John D. Grier, Okemos, Mich.

[73] Assignee: Owens-Illinois, Inc.

[22] Filed: Mar. 11, 1969

[21] Appl. No.: 806,320

[52] U.S. Cl. ............... 117/46 CA, 117/123 A, 117/123 B, 117/169 R, 117/124 A, 117/124 C, 117/125, 117/129

[51] Int. Cl. ...................................................... C03c 17/10

[58] Field of Search .......... 117/46 CB, 46 CC, 46 CA, 169 R, 117/227, 123 A, 123 B, 124 A, 124 C, 125, 129

[56] References Cited

UNITED STATES PATENTS

| | | | |
|---|---|---|---|
| 2,312,229 | 2/1943 | Anderson | 117/46 CA |
| 2,311,513 | 2/1943 | Bell et al. | 117/46 CA |
| 2,384,541 | 9/1945 | Fruth | 117/46 CA |
| 2,461,878 | 2/1949 | Christensen et al. | 117/46 CA |
| 2,551,712 | 5/1951 | Soby | 117/46 CA |
| 3,149,002 | 9/1964 | Place et al. | 117/46 CA |
| 3,208,892 | 9/1965 | Miller et al. | 117/46 CA |
| 3,231,540 | 1/1966 | Vanderbilt | 117/46 CA |
| 3,305,369 | 2/1967 | Cuhra et al. | 117/46 CA |

*Primary Examiner*—William D. Martin
*Assistant Examiner*—M. Sofocleous
*Attorney*—E. J. Holler and Donald K. Wedding

[57] ABSTRACT

There is disclosed a process for coating a substrate which comprises applying to the substrate a polymeric based composition comprising a finely divided, particulate inorganic material dispersed in a low molecular weight, low vapor pressure, liquid polymer consisting of poly (alpha substituted) styrene and having a relatively constant viscosity and thixotropic character and capable of being decomposed or pyrolyzed completely to gaseous products at a relatively low temperature without forming a carbonaceous or like residue having a deleterious effect(s) in the application of the composition to the substrate.

6 Claims, No Drawings

SUBSTRATE COATING PROCESS

THE INVENTION

This invention relates to the preparation of a polymeric based composition which is highly suitable for coating a selected substrate, e.g., for purposes of decorating, protecting, and/or sealing. More particularly, this invention relates to the preparation of a coating or film forming composition comprising a finely divided, particulate, inorganic material dispersed in a low molecular weight, liquid polymer which is capable of being pyrolyzed at a relatively low temperature.

Particulate inorganic coating materials are conventionally applied to substrates by a wet process, that is, while dispersed in a binder-solvent system. Such process typically requires mixing of the binder, the solvent, and the inorganic material to form a paste or slurry which is applied to the surface to be coated. The viscosity of the paste varies with temperature and with the particle size distribution of the inorganic material. Thus, quality control is difficult and the solvent-binder technique is costly in time and material.

The wet coating technique is commonly used to seal glass or ceramic parts, as in the formation of cathode ray tubes wherein the face plate is attached to the funnel. In this technique, a paste having solder glass distributed throughout a binder-solvent system is applied to the edges of one part in the form of a ribbon. The remaining part is then placed in contact with the paste and the assemblage is heated to evaporate the solvent, burn out the binder, and fuse the solder glass. While this technique is extensively used, quality control is difficult and expensive because of carbonaceous or like residue which may not be removed by evaporation or burning during the heating step. Likewise, during the evaporation of a solvent, there are typically inherent changes in the viscosity and/or thixotropic character of the system which may result in such deleterious effects as orange peel formation, fish eye formation, etc., especially on flat surfaces.

In an effort to overcome the difficulties inherent in applying a coating or sealant to substrates via a binder-solvent system, the prior art has used dry coating compositions containing polymeric binders and having the particulate coating material uniformly distributed therethrough. These compositions are formed into films which are applied to the substrate to be coated and then heated to burn out the binder and form a coating of the inorganic material usually in fused or sintered form. However, the presence of carbonaceous residue may still present a problem in such a system. Polymethacrylate and polyisobutylene have been used in the prior art for the purpose of dry coating, but have not proven to be entirely satisfactory because these polymeric compositions cannot be conveniently extruded into film form. Films of these compositions are formed by solvent casting which involves many of the disadvantages inherent in the conventional use of binder-solvent systems for applying inorganic coatings. On decomposition, the polymethacrylate and polyisobutylene binders of the prior art leave a detectable carbonaceous residue. This carbonaceous residue is deterimental to successful use of the polymeric materials for many important applications. On heating, the carbonaceous residue reduces to the elemental state metals present as oxides. When the coated material is used in electrical application, the presence of an electrical conductive metal film is disadvantageous. For instance, when the inorganic coating material is solder glass (usually containing lead oxide), the carbonaceous residue acts to reduce the lead oxide to metallic lead. When this metallic lead is present in a seal in a cathode ray tube, it conducts electricity and requires rejection of the tube. Also, the aesthetic value of the coated piece is decreased by the presence of free metals and this has detracted from the use of such films in glazing.

In accordance with this invention, the disadvantages of the prior art are avoided by preparing a polymeric based composition which can be used for coating or forming a film on a suitable substrate with evaporation of a solvent and without a change of viscosity and/or thixotropic character resulting in such deleterious effects as orange peel formation, fish eye formation, etc., especially on a flat surface.

More particularly, there is prepared a polymeric based composition containing finely divided, particulate, inorganic material dispersed in a low molecular weight, low vapor pressure, liquid polymer having a relatively constant viscosity and/or thixotropic character during the heating cycle of the composition and which decomposes or pyrolyzes completely to gaseous produces at a relatively low temperature without forming and/or leaving a noticeable carbonaceous or other like residue capable of direct and/or indirect deleterious effects, e.g., such as direct interference by the residue with the decorating and/or adherence characteristic of the composition and/or the conversion by the residue of easily reducible inorganic metal oxides to the elemental state.

In the specific practice of this invention, it has been discovered that polystyrene and/or poly(alpha substituted) styrenes having a low molecular weight of less than about 1,000 are especially suitable since such polymers are in a liquid state over a relatively wide temperature range, e.g., from about room or ambient temperature up to about 300° C. Thus, such polymers are initially in a liquid state when the composition is prepared and remain in such state up to polymer pyrolysis and formation of the coating or film on the substrate, e.g., fusion or fixation of the dispersed solid particles. Likewise, such polymers have a low vapor pressure and relatively constant viscosity and/or thixotropic characteristics.

In the preferred practice of this invention the polymer is a poly(alpha substituted) styrene having the structure

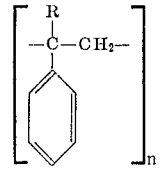

where $n$ is an integer greater than 1 and R is selected from alkyls of less than six carbons, e.g., methyl, ethyl, propyl, butyl, isobutyl, isopropyl, pentyl, isopentyl, neo pentyl, hexyl, etc.

Any finely divided, particulate inorganic coating material can be incorporated into the composition of this invention. By "finely divided, particulate, inorganic coating material" is meant an inorganic, conductive or non-conductive material, in finely divided form, which can be applied to a substrate in the form of a coating, which can be fused, sintered, or particulate. The choice of such materials is virtually unlimited. Suitable materials include by way of example and not limitation, oxides such as silica, alumina and boric oxide; decorative glazes which are glassy compositions containing low melting compounds or fluxes such as the alkali metal oxides, boric oxide and lead oxide; electron emissive compounds, such as the carbonates of barium, strontium and calcium; metals and metallic alloys, such as copper, gold, silver, nickel, platinum, etc.; glasses, and thermally crystallizable glasses; solder glasses; and mixtures of same.

In a preferred embodiment of this invention, the inorganic coating material is solder glass. Solder glasses are well known in the art and are used to seal glass or ceramic surfaces to glass, ceramic or metallic parts. They are also used to coat substrates, especially electrical components such as microcircuits. Vitreous and devitrifiable solder glasses are known in the art and are commercially available. Both types of solder glass can be used in practicing this invention. Exemplary solder glasses for use in the present invention are disclosed in U.S. Pat. Nos. 2,866,298; 2,931,142; 2,936,923; 3,061,664; 3,063,198; 3,080,328; 3,088,833; 3,088,834; 3,088,835; 3,127,278; 3,250,631; 3,291,586 and 3,368,024; all assigned to the assignee of this invention. The solder glass may be used alone or mixed with other inorganic material such as a glass ceramic.

Typical specific solder glass compositions which have been successfully used in the practice of this invention include about 70 to about 80 percent by weight PbO, about 16 to about 8 percent by weight ZnO, about 10 to about 7 percent by weight $B_2O_3$, about 1 to about 4 percent by weight $SiO_2$, about 0 to about 1 percent by weight BaO, and about 0 to about 1 percent by weight $SnO_2$. Such solder glasses have been used alone and/or in combination with about 1 to about 15 percent by weight glass or glass ceramic composition.

The coating composition may be applied to any suitable substrate having any geometric configuration or shape. However, the full advantages of this invention are typically obtained when the composition is applied to a substantially flat surface, e.g., such as a plate glass substrate. However, such surface may contain notches, grooves, or other irregularities for enhancement of the bonding of the coating to the substrate.

The substrate may comprise a wide range of magnetic and non-magnetic materials including glass, ceramic, glass ceramic, metal, carbon, plastic, and mixtures thereof such as ceramic-metallic composites, i.e., cermets. Metal as used herein is intended to include metalloids as well as metal and metalloid oxides. Examples of same include silicon, aluminum, titanium, zirconium, etc., as well as alloys and oxides thereof. If plastic is used for the substrate, it must be capable of taking the heat cycle, e.g., such as some of the high temperature stable polyaromatics.

The proportions of the pyrolyzable polymer and dispersed inorganic material may vary over a broad range depending upon the intended use and required viscosity for the coating composition. Usually, the pyrolyzable polymer is employed in an amount at least sufficient to serve as an adequate vehicle for carrying the quantity of particles required for a particular use, for example, to provide good coating characteristics in the green (unfused or unsintered) state when the particles are applied to a substrate.

Typically, the coating composition comprises about 90 to about 2 weight percent of the pyrolyzable polymer and about 10 to about 98 weight percent of the dispersed, finely divided, particulate, inorganic coating material. Thus, the viscosity of the resulting composition prior to the application of heat and pyrolyzing of the polymer ranges from a highly flowable, e.g., from a sprayable viscosity up to a thick-like paste or putty-like viscosity, e.g., about 50,000 cps at room temperature.

In addition, the coating composition may comprise other ingredients such as wetting and/or leveling agents which pyrolyze cleanly. Also if the coating composition is to be applied to the substrate via a particular process, such as silk screening, various low boiling solvents such as terpinol may be added.

Although the composition of this invention has been referred to herein as a coating and/or film forming composition, it is intended that the terms "coating" and/or "film forming" be interpreted to include a wide variety of uses and not be limited solely to the decorating and/or protecting of a surface; that is, the coating composition of this invention may be suitably used on any substrate requiring a continuous or discontinuous layer or film. Thus, the composition may be used in a variety of applications, e.g., to provide a dielectric or conductive layer or lines (continuous or discontinuous) in electronic systems and components; to provide a decorative and/or protective layer; to provide a sealing or bonding layer for a substrate to be attached to another substrate, etc.

In one specific embodiment hereof, it is contemplated using the composition to prepare small electronic dual in line parts, e.g., for sandwiching or laminating an electronic microcircuit, comprising a small, e.g., ¼ inch by ¾ inch, notched alumina substrate containing a layer of glazed coating composition which is about 8 to 10 mils thick.

In another specific embodiment hereof, the coating composition is applied to the surface of a 5 inches by 6½ inches by ¼ inch plate glass substrate in the assemblage of a gaseous discharge display/memory device. The coating is applied to said substrate as a continuous layer, e.g., so as to provide a dielectric coating thereon, or as continuous or non-continuous, conductive thin lines, e.g., so as to provide electrodes thereon.

Multiple gas discharge display and/or memory panels of the type with which the present invention is concerned are characterized by an ionizable gaseous medium, usually a mixture of two gases at an appropriate gas pressure, in a thin gas chamber or space between a pair of opposed dielectric charge storage members which are backed by conductor (electrode) members comprising a series of thin lines or dots, the conductor members backing each opposing dielectric member being transversely oriented to define a plurality of discrete discharge volumes and constituting a discharge unit. Likewise, in some panels the discharge units are additionally defined by surrounding or confining physical structures such as by cells or apertures in perforated glass plates and the like so as to be physically isolated relative to other units. Typically, the dielectric member and conductor member are applied to a supporting glass substrate with two spaced substrates being appropriately assembled to make up the panel. In this invention, the novel polymeric coating composition can be used to apply the dielectric and/or the conductive electrodes to the substrate and also to seal the edges around the assembled spaced substrates.

The coating composition may be applied to the substrate by any suitable means or technique including extrusion, Meyer rod coating, blade coating, spraying, dipping, and printing methods such as silk screening. Silk screening is especially suitable for applying the coating composition as thin lines on a substrate, e.g., as electrode lines in the form of finely divided fused conductive material such as gold or silver on the glass substrate of a gaseous discharge display/memory device. Likewise, such thin lines, conductive or non-conductive, continuous or non-continuous, can be applied to the substrate by means of line printing apparatus and method as disclosed and claimed in the United States patent application of John D. Grier, Ser. No. 796,797, filed on Feb. 5, 1969, and assigned to the same assignee hereof.

Although the coating composition can be applied to the substrate in a single step, e.g., by one of the aforementioned techniques, it is contemplated that such step may be repeated so as to build up the thickness of the layer on the substrate. Thus, in one embodiment hereof, the coating composition is applied to the substrate, suitably dried, and the sequence repeated several times, e.g., 2 to 8 times, until a desired green state coating thickness, e.g., about 4 to 20 mils, is obtained. The built-up coating (comprised of multiple dried layers) is then suitably cured by heating, e.g., in one or more ovens, so as to pyrolyze the polymer and fuse the inorganic material. In such multiple layer embodiment, the drying of the applied coating is typically by means of radiant heat, e.g., infrared in an amount sufficient to dry the top (exposed) portion of the coating without fusing the inorganic material.

The fusing or sintering conditions of the single or multiple layers of inorganic material will be a function of the material and the intended use of the coated substrate. Typically, the degree of smoothness, e.g., of a glazed surface coating, is determined by the length of time the required fusion or sintering heat is applied.

If the solid inorganic material comprises a solder glass of crystallizable type and the coated substrate is to be subsequently sealed or bonded to another surface by the heating of the coating, the solder glass coating is initially fused to the substrate at a temperature below the crystallization temperature of the solder glass. The coated substrate is then reheated and the vitreous solder glass coating is crystallized during the subsequent sealing step.

The particle size of the solid, inorganic material may vary over a wide range, e.g., from very fine to very coarse. Typically, the more fine the particles, the greater the surface area and the greater the proportion of pyrolyzable, liquid polymer which is required.

Although the pyrolyzable, liquid polymers contemplated herein can be readily prepared, such are also commercially available. For example, the Dow Chemical Company of Midland, Michigan markets poly (alpha methyl) styrene under the trade names of Dow Resins 276–V2 and 276–V9. The properties of these two particular resins are summarized in Table I hereinafter.

TABLE I

| Property | 276–V2 | 276–V9 |
|---|---|---|
| Color | Water White | Water White |
| Color (Iodine Standard) | 0.85 | 0.85 |
| Boiling Range (5% to 90%) at 5 mm. Hg, °C. | 150–300 | 150–300 |
| Specific Gravity at 60/60°C. | 1.01 | 1.04 |
| Pounds/Gallon at 25°C. | 8.40 | 8.66 |
| Viscosity at 60°C., Centipoises | 100–200 | 700–1000 |
| Flash Point (Approximately), °C. | 166 | 182 |
| Fire Point, °C. | 182 | 207 |
| Volatility—100 hrs. at 100°C., % | 28–32 | 18–20 |
| Refractive Index at 60°C. | 1.58 | 1.57 |
| Acid Number, Less Than | 0.1 | 0.1 |
| Iodine Number, Less than | 4.0 | 4.0 |
| Dielectric Constant ($10^3$ c.p.s.) | 2.56 | 2.60 |
| Dissipation Factor ($10^3$ c.p.s.) | 0.0001 | 0.0005 |
| Viscosity at 60°C., Centipoises | 100–200 | 700–1000 |

In accordance with a further embodiment of this invention, it is completed that polymers or different molecular weight may be appropriately blended so as to obtain specifically desired viscosity and/or thixotropic characteristics.

Although not set forth in the Table I, the molecular weight of poly(alpha methyl)styrene may range from about 250 to about 1,000.

The following Example represents one of the best modes contemplated by the inventors in the practice of this invention.

EXAMPLE

A polymeric based coating composition was prepared by dispersing 50 grams of inorganic material in 50 grams of liquid poly(alphamethyl) styrene.

The inorganic material consisted of finely divided vitreous particles equal to or less than about 400 mesh. The vitreous particles were prepared by melting and fritting a glass batch composition consisting essentially of 73.3 percent by weight PbO, 13.4 percent by weight $B_2O_3$, and 13.3 percent by weight $SiO_2$. The polymer was DOW 276–V2.

The composition was applied as a 15 mils thick layer with a Meyer rod on the surface of a 5 inches by 6½ inches glass substrate one-fourth inch thick). The composition containing substrate was then heated at 1,150° F. for 2 to 4 hours to form a very transparent, dielectric layer of about 2 mils thickness. The cured layer exhibited unusual surface smoothness.

The foregoing process was repeated using 30 grams of inorganic material and 70 grams of polymer but the results were not as good; that is, the surface did not have the smoothness perfection as in the 50—50 composition.

Although this invention has been described hereinbefore with reference to certain specific embodiments, it will be understood by those in the art that modifications can be made within the scope of the hereinafter claims.

We claim:

1. A process for coating a substrate with a layer of inorganic material which comprises applying to the substrate a polymeric based composition containing particulate inorganic material dispersed in a low molecular weight, low vapor pressure, liquid polymer having a molecular weight of less than about 1,000 and consisting of poly (alpha substituted) styrene having the structure

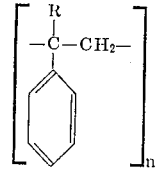

where $n$ is an integer greater than 1 and R is selected from alkyls of less than six carbons, said polymer having a relatively constant viscosity and thixotropic character and capable of being pyrolyzed to gaseous products at a temperature below the fusing temperature of said particulate inorganic material without the formation of a residue having a deleterious effect on said particulate inorganic material, heating the substrate containing said polymer and said particulate inorganic material to a temperature sufficient to pyrolyze said polymer without fusing said particulate inorganic material to said substrate, and then further heating said substrate to a higher temperature sufficient to fuse and particulate inorganic material to said substrate.

2. The process of claim 1 wherein the inorganic material consists of a metal selected from copper, gold, silver, nickel, or platinum.

3. The process of claim 1 wherein the inorganic material comprises a thermally crystallizable glass.

4. The process of claim 1 wherein the inorganic material comprises solder glass.

5. The process of claim 4 wherein the solder glass is vitreous and consists essentially of about 70 to about 80 percent by weight PbO, about 16 to about 8 percent by weight ZnO, about 10 to about 7 percent by weight $B_2O_3$, about 1 to about 4 percent by weight $SiO_2$, about 0 to about 1 percent by weight BaO, and about 0 to about 1 percent by weight $SnO_2$.

6. The process of claim 5 wherein the solder glass is used in combination with about 1 to about 15 percent by weight thermally crystallizable glass or glass ceramic.

* * * * *